(12) United States Patent
Bramauer et al.

(10) Patent No.: US 12,060,001 B2
(45) Date of Patent: Aug. 13, 2024

(54) LIGHT STRIP DEVICE FOR A DOOR LEAF OF A BOARDING SYSTEM OF A RAIL VEHICLE

(71) Applicant: KNORR-BREMSE GESELLSCHAFT MIT BESCHRÄNKTER HAFTUNG, Mödling (AT)

(72) Inventors: Johann Bramauer, Ybbsitz (AT); Matthias Pechhacker, Sonntagberg (AT); Hannes Klenner, Amstetten (AT)

(73) Assignee: KNORR-BREMSE GESELLSCHAFT MIT BESCHRÄNKTER HAFTUNG (AT)

( * ) Notice: Subject to any disclaimer, the term of this patent is extended or adjusted under 35 U.S.C. 154(b) by 20 days.

(21) Appl. No.: 18/017,648

(22) PCT Filed: Jun. 14, 2021

(86) PCT No.: PCT/EP2021/065899
§ 371 (c)(1),
(2) Date: Jan. 23, 2023

(87) PCT Pub. No.: WO2022/017682
PCT Pub. Date: Jan. 27, 2022

(65) Prior Publication Data
US 2023/0311956 A1    Oct. 5, 2023

(30) Foreign Application Priority Data
Jul. 22, 2020    (DE) .................... 10 2020 004 412.3

(51) Int. Cl.
*B60Q 3/00*    (2017.01)
*B60Q 3/41*    (2017.01)
(Continued)

(52) U.S. Cl.
CPC ............... *B60Q 3/41* (2017.02); *B61D 19/02* (2013.01); *B61D 29/00* (2013.01); *F21S 4/24* (2016.01);
(Continued)

(58) Field of Classification Search
CPC .. B60Q 3/41; B60Q 1/324; F21S 4/24; B61D 19/02; B61D 29/00; F21V 9/08; F21V 23/003
See application file for complete search history.

(56) References Cited

U.S. PATENT DOCUMENTS

2008/0170406 A1    7/2008  Lan
2018/0170401 A1*   6/2018  Tenet ........................ E06B 1/70
(Continued)

FOREIGN PATENT DOCUMENTS

DE    19604487 C1       4/1997
DE    102010019764 A1  11/2011
(Continued)

OTHER PUBLICATIONS

International Search Report corresponding to PCT/EP2021/065899 dated Aug. 2, 2021.

*Primary Examiner* — Gerald J Sufleta, II
(74) *Attorney, Agent, or Firm* — Barnes & Thornburg LLP

(57) ABSTRACT

A light strip device to be secured on or in a window jamb of a window opening of a door leaf of a rail vehicle boarding system in a nondestructively releasable manner, wherein the window opening has a window pane. The light strip device has at least: a) one light strip which is provided with a number of light sources arranged in a mutually spaced manner in rows, and b) one holding and installation profile in which the at least one light strip can be received and which is provided with an attachment to the window jamb, (Continued)

wherein c) the holding and installation profile has at least one light through-opening such that light generated by the light sources can penetrate the light through-openings, and the holding and installation profile is opaque with the exception of the light through-openings or d) the holding and installation profile is at least partly transparent.

20 Claims, 4 Drawing Sheets

(51) Int. Cl.
| | | |
|---|---|---|
| *B61D 19/02* | (2006.01) | |
| *B61D 29/00* | (2006.01) | |
| *F21S 4/24* | (2016.01) | |
| *F21V 9/08* | (2018.01) | |
| *B60Q 1/32* | (2006.01) | |
| *F21V 23/00* | (2015.01) | |
| *F21W 107/10* | (2018.01) | |
| *F21Y 113/13* | (2016.01) | |
| *F21Y 115/10* | (2016.01) | |

(52) U.S. Cl.
CPC ................ *F21V 9/08* (2013.01); *B60Q 1/324* (2022.05); *F21V 23/003* (2013.01); *F21W 2107/10* (2018.01); *F21Y 2113/13* (2016.08); *F21Y 2115/10* (2016.08)

(56) References Cited

U.S. PATENT DOCUMENTS

| | | | |
|---|---|---|---|
| 2019/0248466 A1* | 8/2019 | Lee | B64C 1/066 |
| 2019/0255923 A1* | 8/2019 | Salles | B61D 19/026 |
| 2020/0040586 A1* | 2/2020 | Chen | F21V 23/02 |
| 2020/0190897 A1* | 6/2020 | Grein | B60J 10/248 |

FOREIGN PATENT DOCUMENTS

| | | |
|---|---|---|
| DE | 102012011524 A1 | 12/2013 |
| EP | 0789184 B1 | 7/2002 |
| EP | 1533205 A1 | 5/2005 |
| EP | 2018996 A2 | 1/2009 |
| GB | 2475940 A | 6/2011 |
| JP | 2019094018 A | 6/2019 |

\* cited by examiner

LIGHT STRIP DEVICE FOR A DOOR LEAF OF A BOARDING SYSTEM OF A RAIL VEHICLE

CROSS REFERENCE AND PRIORITY CLAIM

This patent application is a U.S. National Phase of International Patent Application No. PCT/EP2021/065899 filed Jun. 14, 2021, which claims priority to German Patent Application No. 10 2020 004 412.3, the disclosure of which being incorporated herein by reference in their entireties.

FIELD

Disclosed embodiments relate to a light strip device for a door leaf of a boarding system of a rail vehicle, a door leaf of a boarding system of a rail vehicle having a light strip device, a boarding system of a rail vehicle having at least one door opening and a door leaf, which is movably guided in relation to the door opening, and a method for providing a door leaf of a boarding system of a rail vehicle with a light strip device.

BACKGROUND

In rail vehicles, it can be important for safety reasons for passengers to be made aware of closing door leaves and/or a readiness to open of the door leaves in a timely manner during boarding and deboarding. This functionality is presently achieved by a corresponding illumination of the door pushbuttons or by separate indicator lights on the closing edges of the door leaves.

SUMMARY

Disclosed embodiments provide a light strip device, which is provided and designed for nondestructive detachable fastening on or in a window soffit of a window opening, having a windowpane, of a door leaf of a boarding system of a rail vehicle. The light strip device includes at least the following:

a) at least one light strip provided with a number of light sources arranged spaced apart in series, b) at least one holding and mounting profile, in which the at least one light strip can be accommodated and which is provided with means for attachment to the window soffit, wherein c) the holding and mounting profile has at least one light passage opening in such a way that light generated by the light sources can penetrate through the light passage openings, and wherein the holding and mounting profile is opaque with the exception of the light passage openings, or wherein d) the holding and mounting profile is at least partially transparent.

The holding and mounting profile in particular has a multiple function, in that it is provided for fixing or for holding the light strip, which is otherwise not connected to the door leaf or the window soffit, on the door leaf, and for fastening the light strip on the window soffit, and for directing the light emitted by the light sources in at least one specific direction.

Disclosed embodiments provide a door leaf of a boarding system of a rail vehicle having a) at least one window opening, which has a window soffit, which forms a circumferential inner surface facing toward the window opening on the window opening, b) a windowpane held on or in the window opening, wherein c) at least one light strip device according to the first aspect is nondestructively detachably fastened on or in the window soffit.

BRIEF DESCRIPTION OF THE FIGURES

Below, disclosed embodiments are illustrated in the drawing and explained in more detail in the follow description. In the drawing.

DETAILED DESCRIPTION

Figure 1:
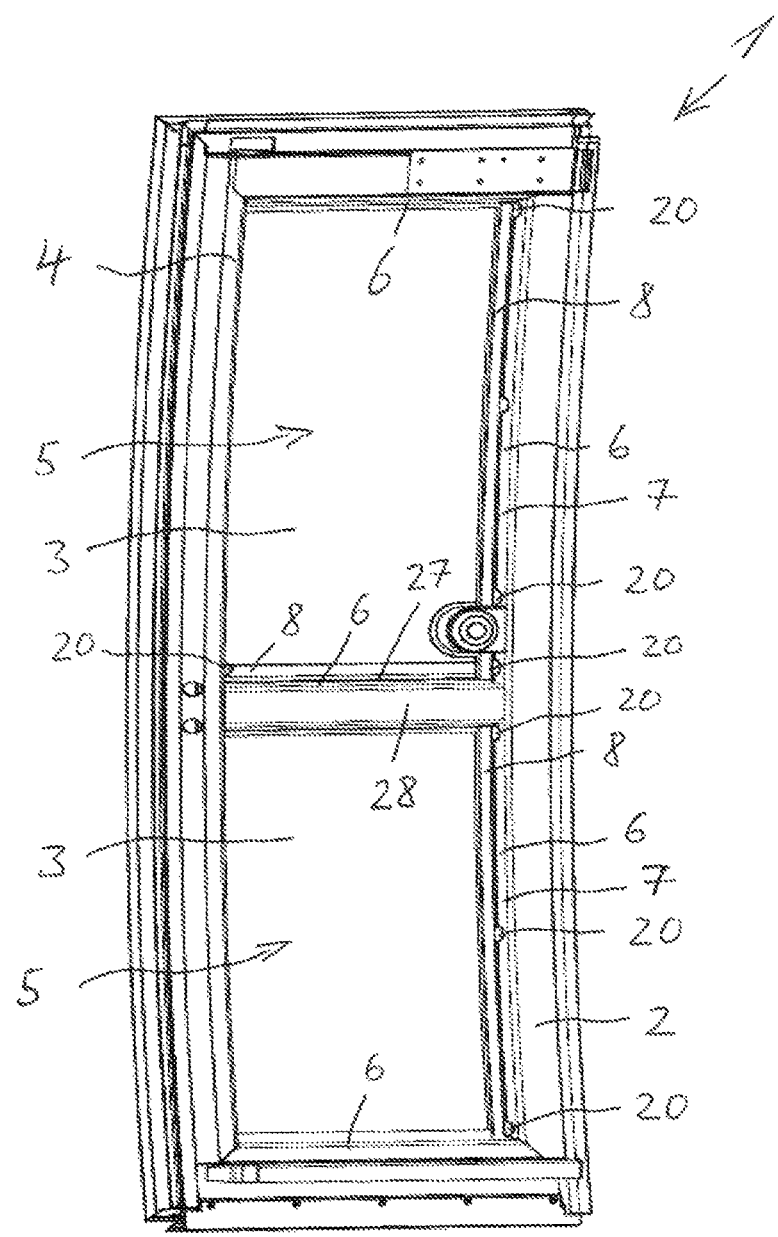
FIG. 1 shows an illustration of an inside of a door leaf having a light strip device according to at least one embodiment.

DE 10 2010 019 764 B4 discloses an integration of light sources into a rubber finger guard of a door leaf arranged directly on a closing edge. Since still further components for safety-relevant functions are generally provided on the closing edge, however, adding light sources to the closing edge of a door leaf is relatively complex and can result in goal conflicts. Furthermore, the closing edge or seal on the closing edge has to be specially designed from the outset in order to be able to accommodate the light sources.

In contrast, disclosed embodiments provide a light strip device, which can be used safely and easily on a door leaf. Furthermore, a door leaf having a light strip device, a boarding system of a rail vehicle having at least one door leaf, and a method for providing a door leaf of a boarding system of a rail vehicle with a light strip device are to be provided.

Disclosed embodiments provide a boarding system of a rail vehicle having at least one door opening and a door leaf, which is movably guided in relation to the door opening, wherein the door leaf is formed by a door leaf.

Disclosed embodiments provide a method for providing a door leaf of a boarding system of a rail vehicle with a light strip device, wherein the door leaf includes a window opening having a window soffit and the window opening is closed by a windowpane, and wherein the light strip device is nondestructively detachably fastened on or in the window soffit.

Disclosed embodiments have technical utility that the light strip device can be nondestructively detachably fastened on or in the window soffit in a simple manner, for example, by at least one screw connection, without the window soffit having to be changed for this purpose or having to have a special design.

Additionally, in accordance with disclosed embodiments, the light strip device can be retrofitted as a retrofit component on the door leaf on or in its window soffit in a simple manner, even if the door leaf previously did not include such a light strip device. Since no further functions are generally provided on a window soffit, a goal conflict with further, in particular safety-relevant functions also cannot arise there.

If an outer side of the door leaf is, for example, partially or completely covered by the windowpane, the window soffit is then only accessible from the inside, so that the light strip device is then also mounted or fastened from the inside of the door leaf on the window soffit (for example, as a retrofit component).

The light strip is optionally formed by a flexible, elongated, and flat body, on or in which the light sources, in particular LEDs, are arranged spaced apart one behind another in series.

The light strip can also comprise an at least partially transparent plastic body, in which an LED band having the LEDs arranged spaced apart one behind another in series are embedded or extrusion coated. The plastic body and the LED band can in particular be flexible or elastic. In particular, the plastic body and/or the LED band are arranged in parallel to the windowpane.

The light strip and in particular the plastic body can have an outer profile viewed in cross section which is formed complementary to an inner profile of the holding and mounting profile. The light strip and in particular the plastic body can then be chambered with the embedded or extrusion coated LED band in a chamber which is formed between the holding and mounting strip, the window soffit, and the windowpane, without, for example, a mechanical connection being provided or necessary between the holding and mounting profile and the light strip or the plastic body.

Furthermore, the plastic body can be made homogeneously transparent or inhomogeneously transparent. Homogeneously transparent means that the plastic body has a consistent transparency over its entire volume. This has the result that light emitted by the embedded or extrusion coated LED band is radiated distributed at approximately equal intensity within the plastic body in all directions. In contrast, in an inhomogeneously transparent plastic body, at least one first section has a greater transparency than at least one second section. More light can then penetrate outward through the at least one first section than through the at least one second section. The radiation of light in a specific direction or in specific directions can thus be deliberately influenced.

In particular, the light strip device can be provided as a retrofit component for retrofitting on or in the window soffit of the door leaf. The door leaf or its window soffit then does not have to be changed or adapted for this purpose.

The holding and mounting profile can include at least the following when viewed in cross section:
a) a first leg extending in parallel to the light strip and the windowpane,
b) a second leg extending in parallel to the light strip and perpendicular to the windowpane and folded over essentially perpendicularly from the first leg,
c) a third leg, which protrudes away, in particular obliquely, from the first leg and which has the means for attachment to the window soffit.

The third leg can be provided here only for mounting the holding and mounting profile on or in the window soffit and can include no light passage opening. However, it is also possible that the third leg includes at least one light passage opening.

In particular, the first leg and/or the second leg and/or the third leg can be provided with at least one light passage opening.

Alternatively or additionally, the first leg and/or the second leg and/or the third leg can also be embodied as transparent, so that the light generated by the light sources can penetrate through.

For example, light passage openings can be arranged in the holding and mounting profile in such a way that radiation or emission of light by means of the light strip device takes place in a direction parallel to the windowpane and/or in one or both directions perpendicular to the windowpane. Light signals can then be emitted toward an outside and/or toward an inside of the door leaf. The outside of the door leaf faces outward here with respect to an interior of the rail vehicle, and the inside of the door leaf faces inward into the interior. Using these measures, light signals can be transmitted to passengers who are located inside and outside the rail vehicle, which signal the presently existing status of the door leaf.

For example, the means for attaching the light strip device in or on the window soffit can comprise push-through openings for fastening screws, which are then, for example, locked in boreholes of the window soffit.

The holding and mounting profile can be manufactured from a metal and can then be embodied as rigid or with limited flexibility, in particular if the light strip device is provided as a retrofit component, in order to be able to perform an adaptation to a shape of the door leaf or the window soffit deviating from a linear or flat shape. In other words, in the case of a curved profile of the door leaf or the window soffit, the light strip device can be bent in accordance with this curved profile and then fastened on or in the window soffit.

Since, as described above, the light strip and in particular the plastic body and the LED band are optionally also flexible or elastic, this is readily possible.

In particular, the light strip device is provided for optical identification of the door position or the status of the door leaf and is actuated in a coordinated manner by an electronic controller. For example, an emission of green light can signal that the door leaf can be opened (opening readiness); in contrast, red light can signal that the door leaf cannot be opened. Flashing, i.e., emission and non-emission of light taking place alternately, can mean that the door leaf is presently being closed and therefore boarding and deboarding of passengers is no longer possible.

According to one refinement, the thickness D of the light strip device can be less than the depth T of the window soffit, wherein the thickness D and the depth T are measured perpendicular to the windowpane. The light strip device then does not protrude beyond the window soffit, which is advantageous with regard to a risk of injury. In particular, the light strip device is arranged countersunk in the window soffit viewed in a direction perpendicular to the windowpane.

The light strip and/or the holding and mounting profile can also contain a diffuser to achieve a uniform light distribution.

According to one refinement, the light strip can also form a structural unit with the holding and mounting profile.

According to one optional refinement, the light strip device can comprise an electronic controller in particular, which in particular selectively activates or actuates at least one light source of the light sources of the light strip in dependence on an input signal in such a way that it radiates light. The input signal can be generated, for example, by a door controller of the boarding system, which controls the door leaf. The controller insofar has a control connection for the input signal and is designed so that it can process the input signal.

The at least one light passage opening can also be designed as an information display passage opening in such a way that the outline of the information display passage opening forms a visually displayable item of information. Alternatively, a transparent (light-transmissive) body (for example a film) can be arranged in or on the light passage opening, on which the visually displayable information is depicted and through which at least one light source can shine, so that the visual information can be displayed in a light-amplified manner.

The information can in particular comprise at least one alphanumeric character, a number, a letter, a graphic, a symbol, and/or a pictogram. A visually displayable item of information is therefore to be understood as an item of information which can be understood or interpreted by a human when they see it.

The at least one information display passage opening can be produced, for example, by corresponding stamping of the holding and mounting profile to form its outline. Alternatively, a transparent (light-transmissive) body (for example a film), for example, can also be arranged in the information display passage opening, through which at least one light source can shine, so that the visual information can be displayed.

For example, multiple information display passage openings arranged in series one behind another, one over another, or one below another can be provided on the holding and mounting profile in order to be able to display terms or words as items of visual information.

The controller can be designed here in such a way that, in dependence on the input signal, it selectively activates at least one light source of the light strip, which is arranged in the area of the at least one information display passage opening. Arranged in the area of the passage opening means that, against the background that the holding and mounting profile is congruent with or overlaps the light strip, the at least one light source of the light strip selectively activated by the controller and the information display passage opening are essentially congruent, so that the light radiated by the light source can penetrate essentially directly through the information display passage opening outward. The item of visual information embodied by the at least one information display passage opening is then backlit by the light passing through, so that the relevant information can be perceived by an observer, such as a passenger of the rail vehicle.

It is apparent that multiple light sources, which are arranged one behind another in series, for example, can be selectively actuated, which are arranged in the area of multiple information display passage openings, for example, to be able to display terms, words, or sentences composed of multiple alphanumeric characters as items of visual information. The visually displayed information can be related in particular here to the status of the door leaf or the door leaves (for example: "doors can be opened" or "door is closing"). With respect to this example, if the door leaf status permits opening of the door leaf, a first arrow can be displayed by a first information display passage opening, which points in the opening direction of the door leaf. In the other case, when the door controller specifies closing of the door leaf, a second arrow can be displayed by a second information display passage opening, which points in the closing direction of the door leaf.

The light strip can also comprise a first section of first light sources, in particular arranged in series, which emits light of a first color, and, separately from the first section, a second section of second light sources arranged in particular in series, which emits light of a second color different from the first color.

This can be implemented in that the light sources comprise LEDs of different colors of the light and/or LEDs having settable light color, wherein the setting of the color of the light is controlled by the (electronic) controller.

The first section of first light sources can then be arranged, for example, in the area of at least one information display passage opening, which displays a first item of information, and the second section of second light sources can be arranged in the area of at least one second information display passage opening, which displays a second item of information differing from the first item of information. The at least one first information display passage opening then represents or embodies a first item of information and the at least one second information display passage opening represents or embodies a second item of information.

The controller can then, in dependence on an input signal, selectively activate either the first section of first light sources or the second section of second light sources in such a way that it emits light.

In other words, the at least one first information display passage opening can be backlit by a light of the first color and the at least one second information display passage opening can be backlit by a light of the second color. In dependence on the actuation by the controller, a first item of information can therefore be backlit by a light of the first color and a second item of information can be backlit by a light of the second color.

With respect to the above example of the door status, for example, the information: "doors can be opened" can be backlit by a light of green color and the information "door is closing" can be backlit by a light of red color.

With respect to this example, alternatively or additionally, the first arrow, which symbolizes a possible opening of the door leaf, can be backlit by a light of green color and the second arrow, which symbolizes a (required) closing of the door leaf, can be backlit by a light of red color.

Alternatively or additionally, at least one light passage opening can be provided with a color filter, which lets pass only one color of the light generated by at least one light source and passing through the at least one light passage opening or filters out a specific color.

A color filter only lets pass a specific color, i.e., a radiation of a certain wavelength, or filters out a specific color. Such a color filter can consist, for example, of colored glass, plastic, or colored film. The color filter can be arranged, for example, in the at least one light passage opening or can also be arranged in front of or behind it with respect to the direction of the light radiated by the at least one light source.

The advantage of a use of such color filters is that then light sources such as LEDs of different color of the light and/or light sources such as LEDs having settable light color are not necessary to display the items of visual information with different colors. Rather, typical LEDs are then sufficient.

At least one first light passage opening can then be provided with a first color filter, which lets pass or filters out a first color of the light generated by at least one first light source and passing through the first light passage openings, and at least one second light passage opening can be provided with a second color filter, which lets pass or filters out a second color, differing from the first color, of the light generated by at least one second light source and passing through the at least one second light passage opening.

The at least one first light passage opening can also form a first information display passage opening, which displays a first item of information, and the at least one second light passage opening can form a second information display passage opening, which displays a second item of information differing from the first item of information.

With respect to the above example, the at least one first information display passage opening and the at least one second information display passage opening can reproduce items of visual information which relate in particular to the status of the door leaf or the door leaves (example: "doors can be opened" or "door is closing"). With respect to this example, if the door leaf status permits opening of the door leaf, a first arrow can also be displayed by a first information display passage opening, which points in the opening direction of the door leaf. In the other case, when the door controller specifies closing of the door leaf, a second arrow can be displayed by a second information display passage opening, which points in the closing direction of the door leaf.

The controller can be designed in such a way that, in dependence on the input signal, it selectively activates at least one first light source of the light strip, which is arranged in the area of the at least one first information display passage opening, or activates at least one second light source of the light strip, which is arranged in the area of the at least one second information display passage opening.

With respect to the above example of the door status, for example, the information "doors can be opened" can be backlit with a light of green color and the information "door is closing" can be backlit with a light of red color. With respect to this example, alternatively or additionally, the first arrow, which symbolizes a possible opening of the door leaf, can be backlit with a light of green color, and the second arrow, which symbolizes a (required) closing of the door leaf, can be backlit with a light of red color. The respective color is caused by the relevant color filter in or on the relevant at least one information display passage opening.

In the light strip device, the holding and mounting profile can include at least the following viewed in cross section:
  a) a first leg extending in parallel to the light strip and to the windowpane,
  b) a second leg extending in parallel to the light strip and perpendicular to the windowpane and folded over essentially perpendicularly from the first leg,
  c) a third leg, which protrudes away, in particular obliquely, from the first leg and has the means for attachment to the window soffit.

The first leg and/or the second leg can be provided with at least one light passage opening. Furthermore, the means for attachment to the window soffit can comprise push-through openings for fastening screws. In the light strip device, the holding and mounting profile can also be manufactured from a metal.

In the door leaf according to disclosed embodiments, the light strip device can be nondestructively detachably fastened on or in a vertical section and/or horizontal section of the window soffit, viewed in the usage position of the door leaf. In the door leaf, the light passage opening can also be arranged and designed in such a way that light generated by the light sources and passing through the light passage opening is directed in parallel and/or perpendicular to the windowpane. In the door leaf, the light strip device can also be arranged on or in the window soffit in such a way that light generated by the light sources can pass through the windowpane in the direction (Z) of an outside and/or in the direction (Y) of an inside of the door leaf and/or in the direction (X) in parallel to the windowpane. Furthermore, in the door leaf, light passage openings can be formed in the first leg and/or at least in the second leg of the holding and mounting profile. In the door leaf, viewed in cross section, a chamber can also be formed between the holding and mounting profile, the window soffit, and the windowpane, in which at least the light strip is held. Not least, in the door leaf, the light strip device can be arranged countersunk in the window soffit.

As described at the outset, the disclosed embodiments relate to a boarding system of a rail vehicle including at least one door opening and a door leaf, which is movably guided in relation to the door opening, wherein the door leaf is formed by an above-described door leaf.

As described at the outset, disclosed embodiments also relate to a method for providing a door leaf of a boarding system of a rail vehicle with a light strip device, wherein the door leaf includes a window opening having a window soffit and the window opening is closed by a windowpane, wherein the light strip device is nondestructively detachably fastened on or in the window soffit.

According to a refinement of the method, the light strip device is an above-described light strip device. The light strip device can be nondestructively detachably fastened on the door leaf in the method in particular as a retrofit component or as a structural unit.

A door leaf 1 of a rail vehicle shown in FIG. 1 from the viewpoint of the interior of a rail vehicle includes a door frame 2 and, for example here, a windowpane 3, which is held in a window frame 4 and closes, for example, two window openings 5 here. The window openings 5 each have a window soffit 6, which forms a circumferential inner surface facing toward the respective window opening 5 on the respective window opening 5. The door leaf 1 is movably guided in relation to a door opening (not shown here) of the rail vehicle and is part of a boarding system of the rail vehicle.

The door leaf 1 is shown in the vertical usage position, and is formed convexly viewed from the outside and concavely viewed from the inside with respect to a vertical plane, for example. Therefore, with respect to the vertical plane, the vertical sections 7 of the window soffits 6 are also formed convexly viewed from the outside and concavely viewed from the inside.

The door leaf 1 is completely covered here, for example, on its outside by the transparent windowpane, so that the window soffits 6 of the door leaf 1 are only accessible from the inside here. On or in, for example, vertical sections 7 of the window soffits 6 on the same side, two light strip devices 8 are nondestructively detachably fastened in particular as retrofit components, for example by screw connections. In other words, the two light strip devices 8 have optionally been retrofitted on the door leaf 1, because the door leaf 1 previously did not have light strip devices 8.

In order that the two light strip devices 8 can be flexibly adapted to arbitrary curves of door leaves or window soffits (for example by bending), they are optionally embodied as flexible elongated bodies having low thickness D.

Figure 2:
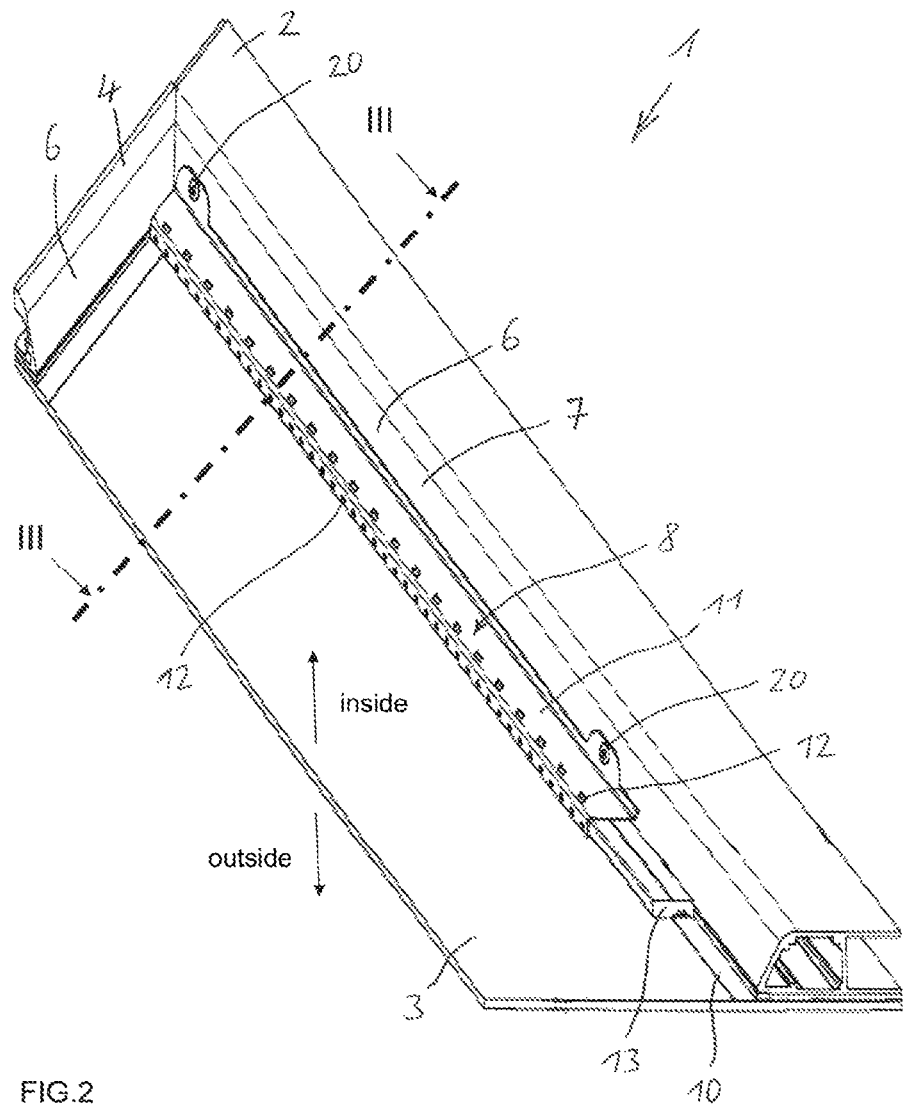
FIG. 2 shows a perspective view, partially cut away, of the inside of the door leaf of FIG. 1.
Figure 3:
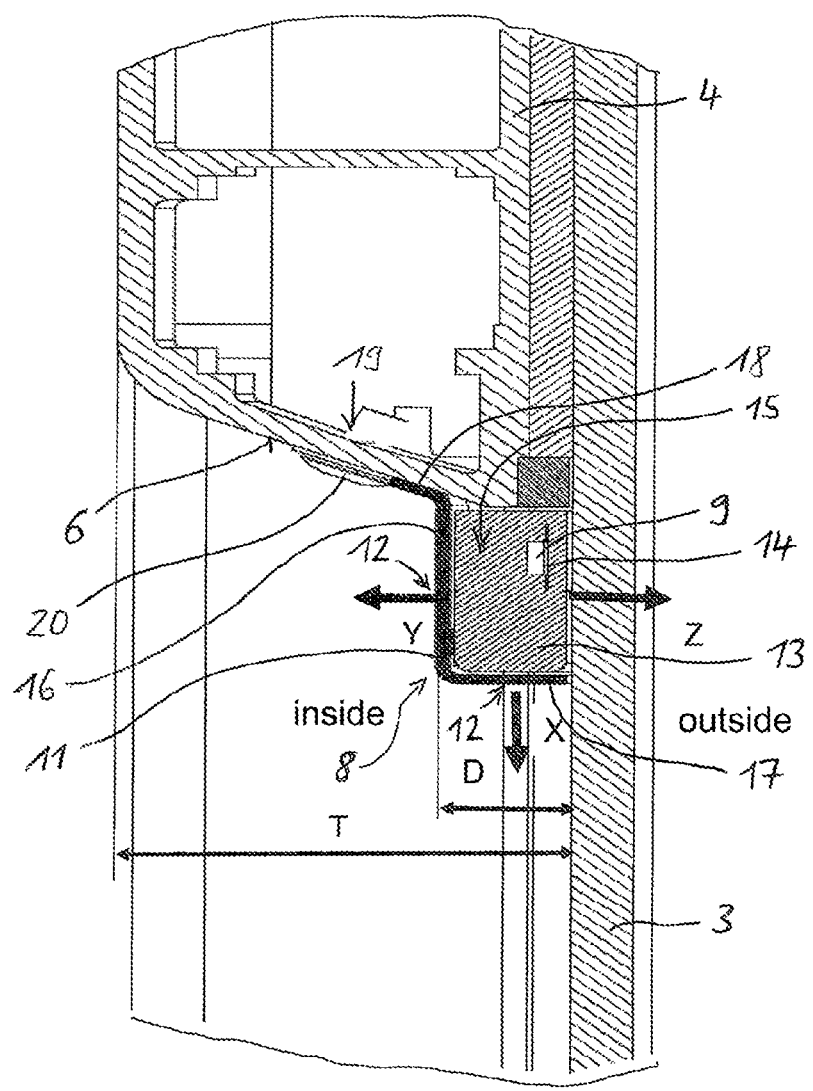
FIG. 3 shows a cross-sectional view of the door leaf along line III-III of FIG. 2.

As can be seen from FIG. 2 and FIG. 3, a light strip device 8 includes here, for example, a light strip 10 provided with a number of light sources 9 arranged spaced apart in series in relation to the longitudinal extension, which comprises here, for example, an LED band 14, wherein the light sources 9 are formed by LEDs.

In addition, a light strip device 8 also has a holding and mounting profile 11, in which the light strip 10 is accommodated and by which the light strip 10 is held on the window soffit 6. As can be seen from FIG. 2 in particular, the holding and mounting profile has multiple light passage openings 12 in such a way that the light generated by the light sources 9 of the light strip 10 can penetrate outward through the light passage openings 12. With the exception of the light passage openings 12, the holding and mounting profile 11 is optionally opaque.

The light strip 10 comprises, for example, a transparent plastic body 13 here, in which the LED band 14 having the light sources 9 (LEDs) arranged spaced apart one behind another in series is embedded or extrusion coated. The plastic body 13 and the LED band 14 are in particular made flexible or elastic here.

In particular, the light strip and in particular the plastic body 13 have an outer profile viewed in cross section, which is formed complementary to an inner profile of the holding and mounting profile 11. Then, for example, the light strip 10 and in particular the plastic body 13 having the embedded or extrusion coated LED band 14 here is chambered in a chamber 15 formed between the holding and mounting strip 11, the window soffit 6, and the windowpane 3, without, for example, a mechanical or other formfitting connection being provided or necessary between the holding and mounting profile 11 and the light strip 10.

The holding and mounting profile 11, for example, is manufactured from a material which is flexible in such a way that it can be bent from a linear state into a bent state, in order to adapt it to the curved profile of the window soffits 6. Because the thickness of the walls of the holding and mounting profile 11 is relatively low and because its longitudinal extension is relatively large in relation thereto, such an adaptation can also be achieved if the holding and mounting profile 11 consists of a metal, for example of aluminum. Alternatively, any material could be used for the holding and mounting profile which permits limited bending in relation to the geometry of the holding and mounting profile 11.

The holding and mounting profile 11 has, viewed in cross section, for example, a first leg 16 extending in parallel to the light strip 10 and to the windowpane 3, a second leg 17 extending in parallel to the light strip 10 and perpendicular to the windowpane 3 and bent over essentially perpendicular from the first leg 16, and a third leg 18 protruding away from the first leg 16, which points away from the second leg here, for example, and which is provided, for example, with boreholes 19, in order to be able to detachably connect the holding and mounting profile 11, in particular by screw connections 20, to the window soffit 6. For this purpose, the window soffit 6 has threaded boreholes or is provided with them when the light strip devices 8 are retrofitted on the door leaf 1.

The third leg 18 is optionally provided here only for mounting the holding and mounting profile 11 on the window soffit 6 and does not have a light passage opening 12, while the first leg 16 and the second leg 17 are each provided with multiple light passage openings 12 arranged spaced apart viewed in the longitudinal extension. Optionally, the light passage openings 12 are always arranged in the area of the light sources 9 (LEDs) in the light strip 10.

Since the first leg 16 provided with light passage openings 12 is arranged in parallel to the windowpane 3 and the second leg 17 provided with light passage openings 12 is arranged perpendicular to the windowpane 3, starting from the light sources 9 (LEDs), light signals can be emitted through the light passage openings 12 perpendicular and in parallel to the windowpane 3. Because the light strip 10 directly contacts the windowpane 3 here, light signals are sent through the windowpane 3 to the outside of the door leaf 1 and also through the light passage openings 12 in the first leg 16 to the inside of the door leaf 1, as indicated by the arrows Y and Z. Furthermore, light signals also pass through the light passage openings 12 in the second leg 17 in parallel to the windowpane 3 to the inside of the door leaf, as indicated by the arrow X.

As is additionally apparent from FIG. 2 and FIG. 3, the thickness D of the light strip device 8 can be less than the depth T of the window soffit 6, wherein then the light strip device 8 does not protrude beyond the window soffit 6. The light strip device 8 is therefore arranged, for example, countersunk in the window soffit 6 or in the door leaf 1.

Using these measures, light signals, which signal the presently existing status of the door leaf 1, can be transmitted to passengers who are located inside and outside the rail vehicle. In particular, the light strip devices 8 are provided for optical identification of the door position or the status of the door leaf 1 and are actuated in a coordinated manner by an electronic controller 21 shown in FIG. 4. This electronic controller 21 receives for this purpose an input signal 25 from an electronic door leaf controller 22. The electronic controller insofar has a control connection for the input signal and is designed so that it can process the input signal 25. The electronic controller 21 can selectively activate or actuate at least one light source 9a, 9b of the light sources 9 of the light strip 10 in dependence on an input signal 25 in such a way that it radiates light in particular in a specific color in each case.

Figure 4:
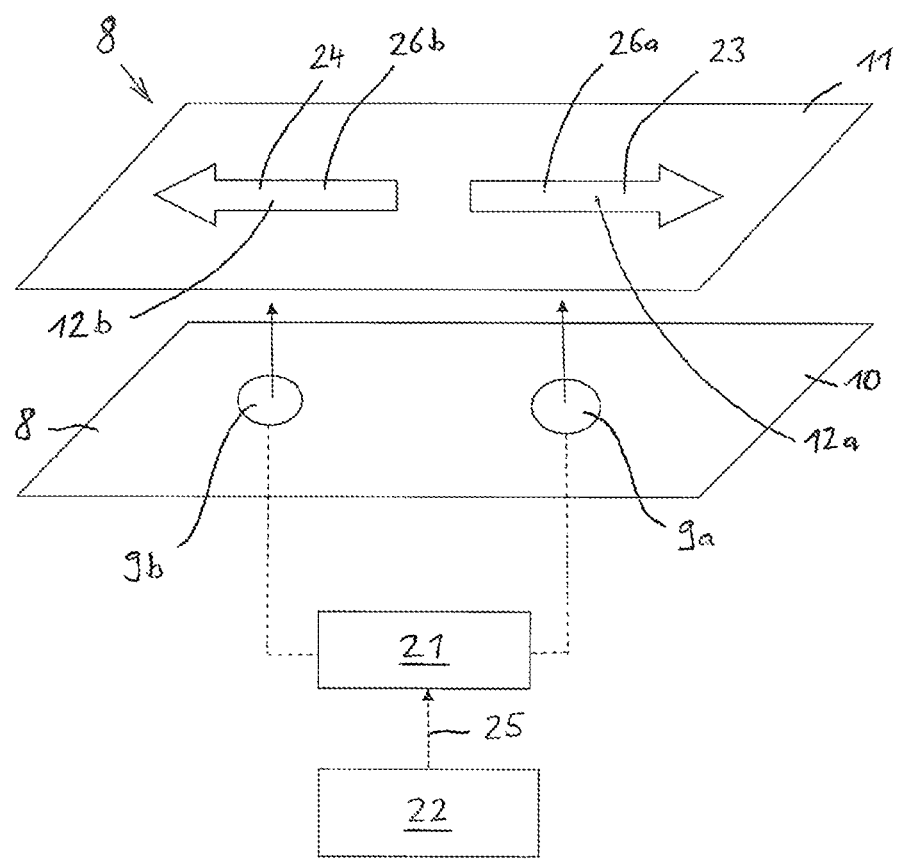
FIG. 4 shows a schematic and perspective illustration of a further embodiment of the light strip device.

In the example shown in FIG. 4, a light strip device 8 is arranged horizontally on the door leaf 1, for example, in a horizontal section 27 of the window soffit 6, which is formed on a cross web 28 of the window frame 6.

For example, emission of green light can signal that the door leaf 1 can be opened (opening readiness) or is presently opening; in contrast, red light can signal that the door leaf 1 cannot be opened or is presently closing. Flashing, i.e., emitting and non-emitting of light taking place alternately, can mean that the door leaf 1 is presently being closed and therefore boarding and deboarding of passengers is no longer possible.

The further embodiment shown in FIG. 4 relates to such signaling of the door leaf status. A first information display passage opening 12a, for example, stamped into the wall of the holding and mounting profile 11, is formed therein in outline, for example, as a first arrow 23, which points here, for example, in the opening direction of the door leaf 1. Furthermore, a second information display passage opening 12b, for example, stamped into the wall of the holding and mounting profile 11, is also formed in outline, for example, as a second arrow 24, which points here, for example, in the closing direction of the door leaf 1.

In general, at least one light passage opening 12 can therefore be embodied as an information display passage opening in such a way that the outline of the information display passage opening forms a visually displayable item of information. The information can comprise in particular at least one alphanumeric character, a number, a letter, a graphic, a symbol, and/or a pictogram. A visually displayable item of information is therefore to be understood as an item of information which can be understood or interpreted by a human when they see it.

Multiple information display passage openings 12a, 12b arranged in series one after another, one over another, or one below another on the holding and mounting profile 11 can be provided here to be able to display terms, numbers, or words or combinations thereof using symbols or pictograms as visual items of information.

In the example of FIG. 4, a first light source is arranged in the area of the first information display passage opening 12a formed as the first arrow 23, and a second light source 9b is arranged in the area of the second information display passage opening 12b formed as the second arrow 24. Against the background that the holding and mounting profile 11 is congruent with or overlaps the light strip 10 (see FIG. 3), this means that viewed in the direction perpendicular to the light strip 10, the first light source 9a essentially aligns with the first information display passage opening 12a formed as the first arrow 23 and the second light source 9b essentially aligns with the second information display passage opening 12b formed as the second arrow 24. In other words, the first light source 9a is congruent with the first information display passage opening 12a formed as the first arrow 23 and the second light source 9b is congruent with the second information display passage opening 12b formed as the second arrow 24 in the direction perpendicular to the light strip 10, so that the light emitted by the relevant light source 9a or 9b can penetrate outward essentially directly through the relevant information display passage opening 12a or 12b. The visual information embodied by the at least one information display passage opening 12a or 12b is then backlit by the light passing through, so that the relevant items of information, the two arrows 23 and 23 here, can be perceived by a passenger of the rail vehicle from the outside (for example on a boarding platform or a stop) or from the inside (in a cabin or in a railcar).

In the example here, the first light source 9a is an LED which only radiates light in green color and the second light source 9b is an LED which can only radiate light in red color.

This can be implemented in that the light sources 9a, 9b comprise LEDs of different colors of the light and/or LEDs having settable light color, wherein the setting of the color of the light is controlled by the (electronic) controller.

The electronic controller 21 can then selectively activate either the first light source 9a or the second light source 9b in dependence on an input signal 25 in such a way that they radiate light.

In other words, the first information display passage opening 12a can then be backlit with a light of a first color and the second information display passage opening 12b can then be backlit with a light of a second color. In dependence on the actuation by the controller 21, a first item of information can therefore be backlit with a light of a first color and a second item of information can be backlit with a light of a second color.

With respect to the above example of the door status, for example, the information "doors can be opened" can be backlit with a light of green color and the information "door is closing" can be backlit with a light of red color. The two light sources 9a and 9b are thus LEDs of different colors of the light here. Alternatively, however, the two light sources 9a and 9b can also be designed as LEDs of different colors of the light, i.e., the LEDs can each only radiate light of one color when they are actuated by the controller 21.

When the input signal 25 introduced by the electronic door leaf controller into the electronic controller 21 of the light strip 10 then comprises the information that the door leaf 1 can be opened or is currently opening, the electronic controller 21 then only actuates the first light source 9a, for example, so that the first arrow 23 is backlit with light in green color. Passengers of the rail vehicle can then understand the first arrow 23 backlit in this way in green color as an indication that the relevant door leaf 1 can be opened, for example, by operating a corresponding operating element. In this door leaf status, the second light source 9b is then not actuated, so that the second arrow 24 is not backlit.

In contrast, when the input signal 25 introduced by the electronic door leaf controller into the electronic controller 21 of the light strip 10 comprises the information that the door leaf 1 has to remain closed or is currently closing, the electronic controller 21 then only actuates, for example, the second light source 9b, so that the second arrow 24 is backlit with light in red color. Passengers of the rail vehicle can then understand the second arrow 24 backlit in this manner in red color as an indication that the relevant door leaf 1 is to remain closed or is currently closing. In this door leaf status, the first light source 9a is then not actuated, so that the first arrow 23 is not backlit.

Alternatively or additionally, the two light passage openings 12a and 12b can also each be provided with a color filter 26a, 26b, which only lets pass one color (here: "green" or "red") of the light radiated by the relevant light source 9a or 9b through the relevant information display passage opening 12a or 12b.

The color filters 26a, 26b therefore only let one specific color, i.e., a radiation of a specific wavelength, pass here and are optionally arranged in the relevant light passage openings 12a and 12b, i.e., they do close the light passage openings 12a and 12b, but are transmissive to light of a specific color. LEDs of a different color of the light and/or LEDs having settable light color are then not necessary. The respective displayed color is then caused by the relevant color filter 26a, 26b in the relevant information display passage opening 12a, 12b.

A first color filter 26a may then, for example, only let pass light having green color from the light generated by the first light source 9a through the first information display passage opening 12a designed as the first arrow 23 and a second color filter 26b may only let pass light having red color from the light generated by the second light source 9b through the second information display passage opening 12b designed as the second arrow 24.

The controller 21 then selectively activates, in dependence on the input signal 25, the first light source 9a of the light strip 10 when the door leaf 1 can be opened or is presently opening and the second light source 9b of the light strip 10 when the door leaf 1 is to remain closed or is presently closing. Then, either the first arrow 23 is illuminated with green color or the second arrow 24 is illuminated with red color.

The example described in reference to FIG. 4 is not restricted to individual light sources 9a, 9b in each case; rather, first and second sections of multiple such light sources 9a, 9b can be provided, which are then actuated in the described manner. It is also clear that the door leaf 1 can form a door leaf of a one-leaf or two-leaf boarding system of the rail vehicle, wherein then, for example, each of the door leaves is equipped with at least one such light strip device 8.

LIST OF REFERENCE SIGNS 1 door leaf
2 door frame
3 windowpane
4 window frame
5 window opening
6 window soffit 7 vertical section
8 light strip device
9 light source
10 light strip
11 holding and mounting profile
12 light passage openings
12a first information display passage opening
12b second information display passage opening
13 plastic body
14 LED band
15 chamber
16 first leg
17 second leg
18 third leg
19 boreholes
20 screw connection
21 electronic controller
22 electronic door leaf controller
23 first arrow
24 second arrow
25 input signal
26a first arrow
26b second arrow
27 horizontal section
28 cross web
X arrow
Y arrow
Z arrow
D thickness
T depth

The invention claimed is:

1. A light strip device for nondestructive detachable fastening on or in a window soffit of a window opening, having a windowpane, of a door leaf of a boarding system of a rail vehicle, the light strip device comprising:
 at least one light strip provided with a plurality of light sources arranged spaced apart in series,
 at least one holding and mounting profile, in which the at least one light strip is accommodated and which is provided with an attachment to the window soffit,
 wherein the holding and mounting profile includes at least one light passage opening in such a way that light generated by the light sources penetrates through the light passage openings and wherein the holding and mounting profile is opaque with the exception of the light passage openings, or
 wherein the holding and mounting profile is at least partially transparent.

2. The light strip device of claim 1, wherein the light strip is formed by a flexible, elongated, and flat body, on or the light sources are arranged spaced apart one behind another in series.

3. The light strip device of claim 2, wherein the light strip comprises an at least partially transparent plastic body in which an LED band having the LEDs arranged spaced apart one behind another in series as light sources is embedded or extrusion coated.

4. The light strip device of claim 1, further comprising a controller, which, in dependence on an input signal, activates at least one light source of the light strip selectively such that it radiates light.

5. The light strip device of claim 4, wherein the at least one light passage opening is an information display passage opening in such a way that the outline of the information display passage opening forms an item of visually displayable information, or a transparent body is arranged in or on the light passage opening, on which the visually displayable information is depicted.

6. The light strip device of claim 5, wherein the information comprises at least one alphanumeric character, a graphic, a symbol, and/or a pictogram.

7. The light strip device of claim 5, wherein the controller is configured such that, in dependence on the input signal, it selectively activates at least one light source of the light strip, which is arranged in the area of the at least one information display passage opening.

8. The light strip device of claim 5, wherein the light strip comprises a first section of first light sources, which radiate light of a first color, and, separately from the first section, a second section of second light sources, which radiate light of a second color different from the first color.

9. The light strip device of claim 8, wherein the light sources:
 comprise LEDs of different color of the light, and/or
 comprise LEDs having settable light color, wherein the setting of the color of the light is controlled by the controller.

10. The light strip device of claim 8, wherein the first section of first light sources is arranged in the area of at least one first information display passage opening, which displays a first item of information, and that the second section of second light sources is arranged in the area of at least one second information display passage opening, which displays a second item of information differing from the first item of information.

11. The light strip device claim 10, wherein the controller, in dependence on an input signal, selectively activates either the first section of first light sources or the second section of second light sources in such a way that it radiates light.

12. The light strip device of claim 1, wherein at least one light passage opening is provided with a color filter, which only lets pass one color of the light generated by at least one light source through the at least one light passage opening or filters out a specific color.

13. The light strip device of claim 12, wherein at least one first light passage opening is provided with a first color filter, which lets pass or filters out a first color of the light generated by at least one first light source through the first light passage openings, and that at least one second light passage opening is provided with a second color filter, which lets pass or filters out a second color, different from the first color, of the light generated by at least one second light source through the at least one second light passage opening.

14. The light strip device of claim 13, wherein the at least one first light passage opening forms a first information display passage opening, which displays a first item of information, and wherein the at least one second light passage opening forms a second information display passage opening, which displays a second item of information differing from the first item of information.

15. The light strip device of claim 14, wherein the controller is configured such that, in dependence on the input signal, it selectively activates at least one first light source of the light strip, which is arranged in the area of the at least one first information display passage opening, or activates at least one second light source of the light strip, which is arranged in the area of the at least one second information display passage opening.

16. The light strip device claim 1, wherein the light strip, viewed in cross section, has an outer profile which is complementary to an inner profile of the holding and mounting profile.

17. The light strip device of claim 1, wherein the light strip device is provided as a retrofit component for later fastening or retrofitting on or in the window soffit of the door leaf.

18. The light strip device of claim 1, wherein the light strip device is provided for optical identification of the door position or the status of the door leaf and is actuated by an electronic controller.

19. A door leaf of a boarding system of a rail vehicle, the door leaf comprising:
- at least one window opening, which has a window soffit, which forms a circumferential inner surface facing toward the window opening on the window opening,
- a windowpane held on or in the window opening, and
- a light strip device for nondestructive detachable fastening on or in the window soffit of the window opening, the light strip device including at least one light strip provided with a plurality of light sources arranged spaced apart in series, at least one holding and mounting profile, in which the at least one light strip is accommodated and which is provided with an attachment to the window soffit, wherein the holding and mounting profile includes at least one light passage opening in such a way that light generated by the light sources penetrates through the light passage openings and wherein the holding and mounting profile is opaque with the exception of the light passage openings, or wherein the holding and mounting profile is at least partially transparent.

20. A boarding system of a rail vehicle having at least one door opening and a door leaf, which is movably guided in relation to the door opening, characterized in that the door leaf is formed by the door leaf of claim 19.

* * * * *